May 1, 1956　　　M. H. LANGE　　　2,743,513
METHOD OF MAKING SLIDE FASTENER CHAIN

Original Filed Sept. 30, 1947　　　10 Sheets-Sheet 1

INVENTOR.
Max H. Lange
BY

May 1, 1956      M. H. LANGE      2,743,513

METHOD OF MAKING SLIDE FASTENER CHAIN

Original Filed Sept. 30, 1947      10 Sheets-Sheet 3

INVENTOR.

Max H. Lange

BY

May 1, 1956 — M. H. LANGE — 2,743,513
METHOD OF MAKING SLIDE FASTENER CHAIN
Original Filed Sept. 30, 1947 — 10 Sheets-Sheet 5

INVENTOR.
Max H. Lange
BY

May 1, 1956  M. H. LANGE  2,743,513
METHOD OF MAKING SLIDE FASTENER CHAIN
Original Filed Sept. 30, 1947  10 Sheets-Sheet 7
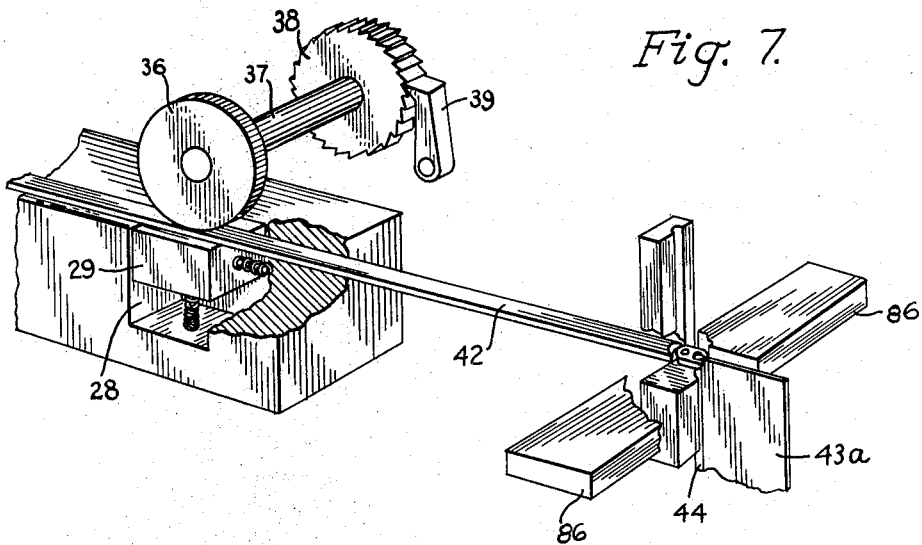
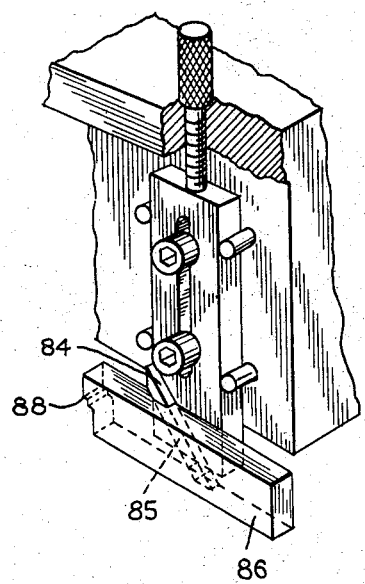
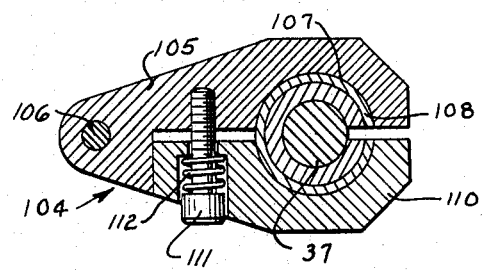
INVENTOR.
MAX H. LANGE
BY May 1, 1956　　　　　　　M. H. LANGE　　　　　　　2,743,513
METHOD OF MAKING SLIDE FASTENER CHAIN
Original Filed Sept. 30, 1947　　　　　　　　　　　　10 Sheets-Sheet 8

INVENTOR.
MAX H. LANGE
BY

May 1, 1956 M. H. LANGE 2,743,513
METHOD OF MAKING SLIDE FASTENER CHAIN
Original Filed Sept. 30, 1947 10 Sheets-Sheet 9

INVENTOR.
MAX H. LANGE
BY

May 1, 1956  M. H. LANGE  2,743,513
METHOD OF MAKING SLIDE FASTENER CHAIN
Original Filed Sept. 30, 1947  10 Sheets-Sheet 10

INVENTOR.
MAX H. LANGE
BY

United States Patent Office 2,743,513
Patented May 1, 1956

2,743,513

METHOD OF MAKING SLIDE FASTENER CHAIN

Max H. Lange, New York, N. Y., assignor to Sarah R. Morse

Original application September 30, 1947, Serial No. 776,906, now Patent No. 2,639,755, dated May 26, 1953. Divided and this application April 6, 1953, Serial No. 356,861

4 Claims. (Cl. 29—410)

This invention relates to methods for forming and attaching metallic slide fastener elements to a cloth tape, this application being a division of my Patent #2,639,755, issued May 26, 1953.

The principal object of this invention is to provide methods for shearing individual elements in such manner as to preclude the formation of chips and in such manner as to avoid the formation of undue burrs on the backs of the elements.

It is a specific object to provide methods for shearing the elements and of retracting the wire being fed so that burrs will not be formed.

Another object is to provide methods for cleanly shearing each element before clamping thereof to the tape, holding each element by the tool which sheared it and by the clamping jaws, thus maintaining perfect position with the cloth tape and thereafter clamping it to the tape. As will hereinafter more fully appear, this requires that the sheared element proceed upwardly into the shearing punch after shearing has been completed. During the progress of the sheared element up into the punch the fed wire is retracted.

Figure 1:
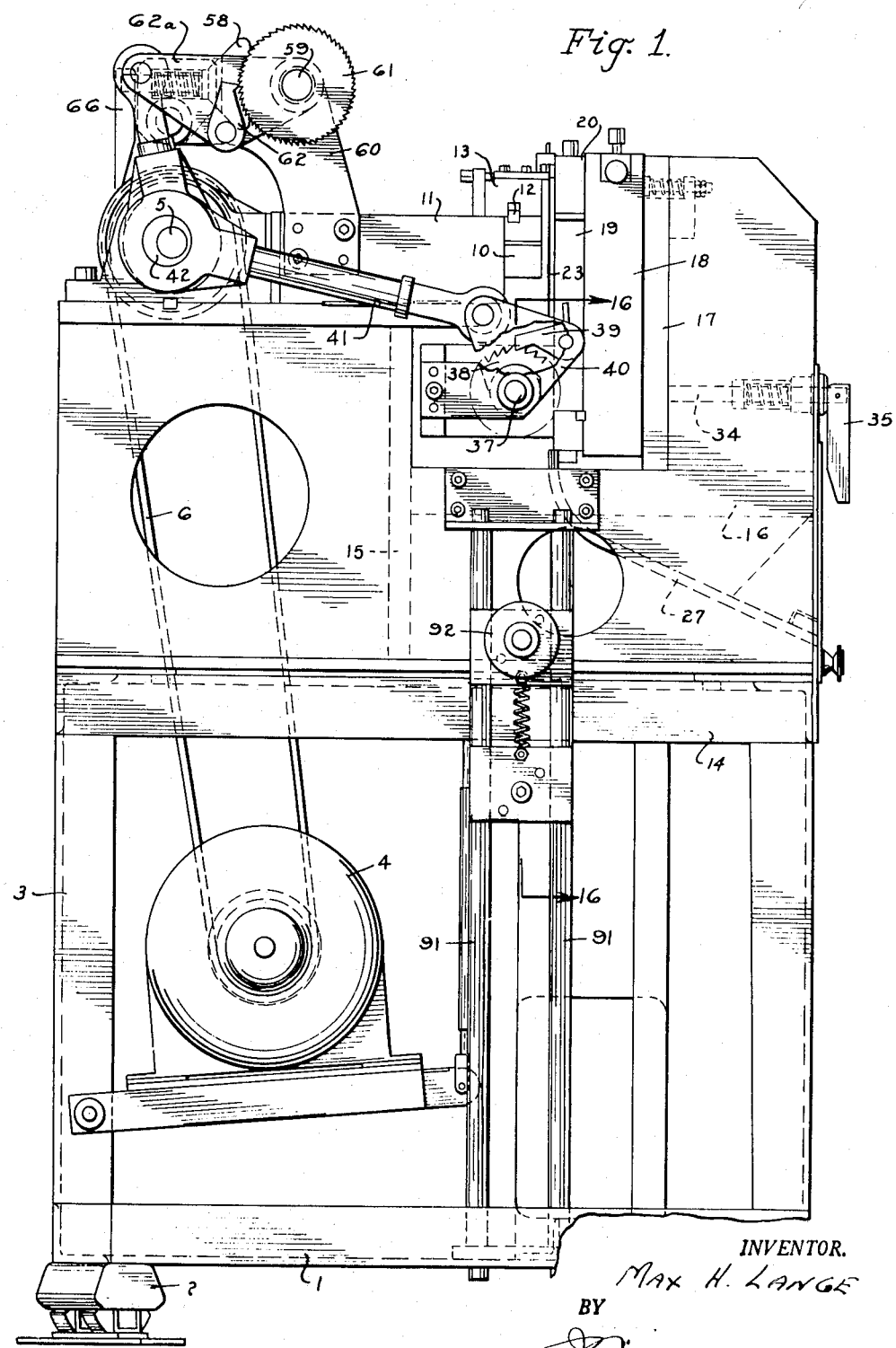
Figure 2:
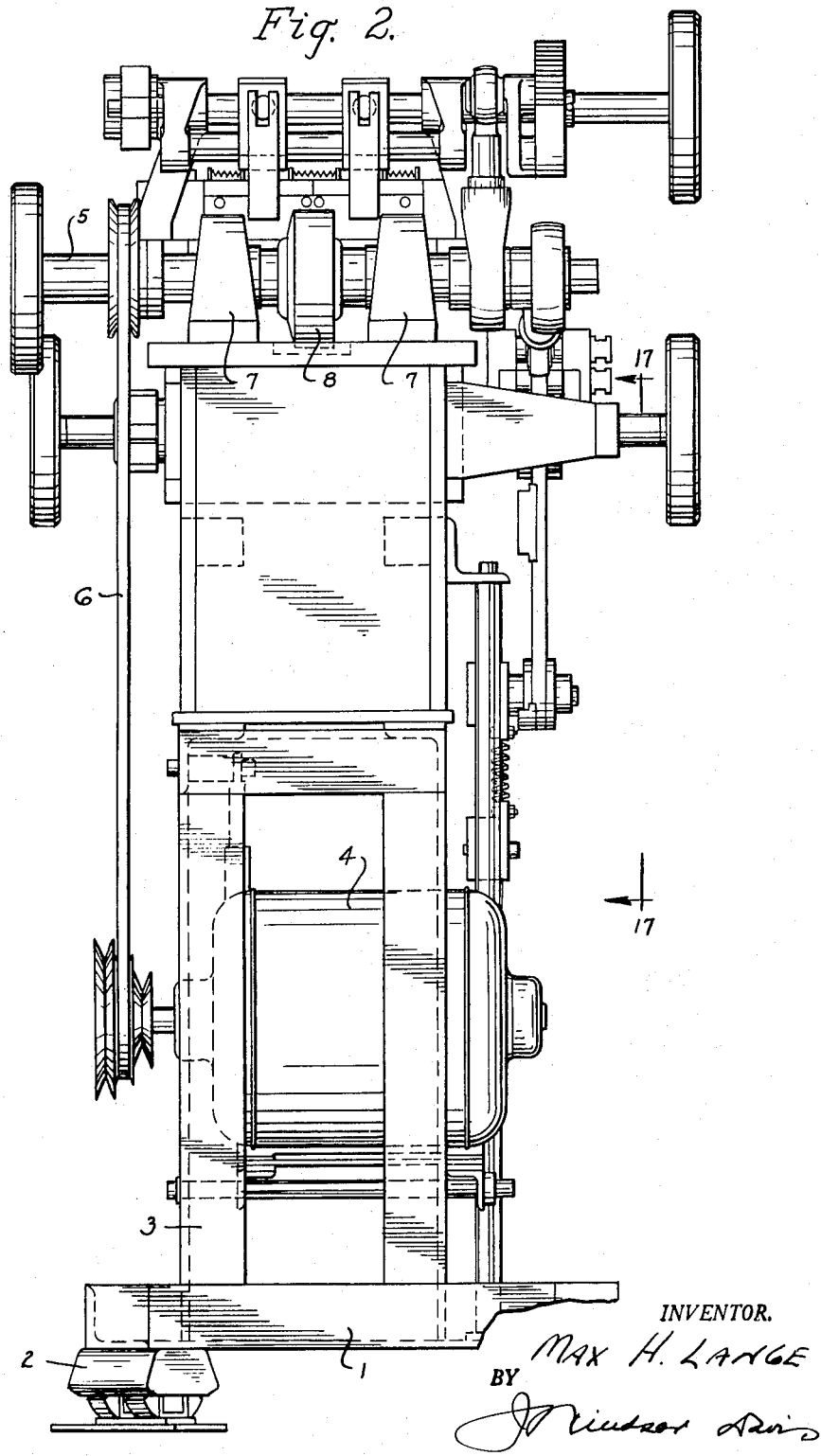
Figure 3:
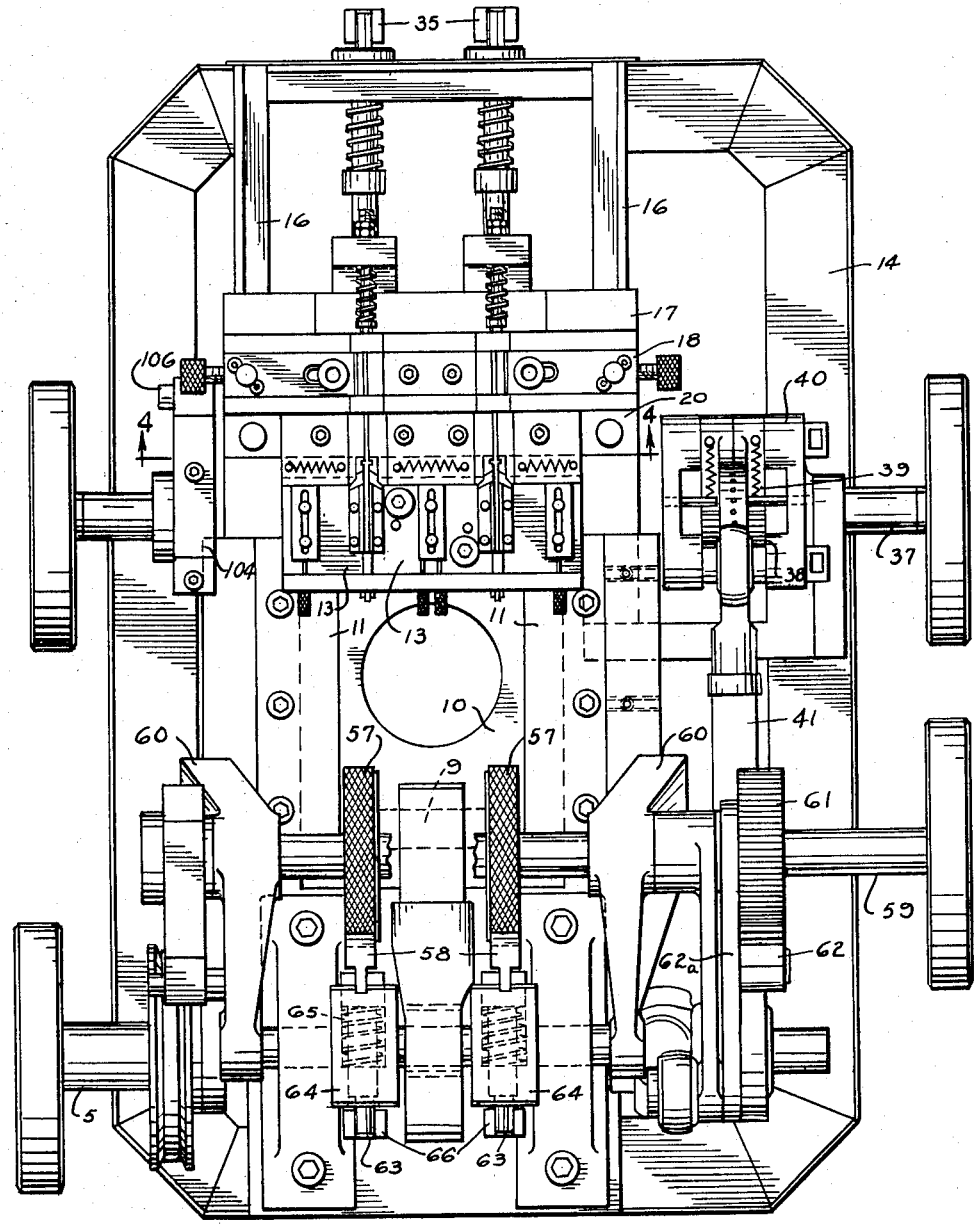
Figure 4:
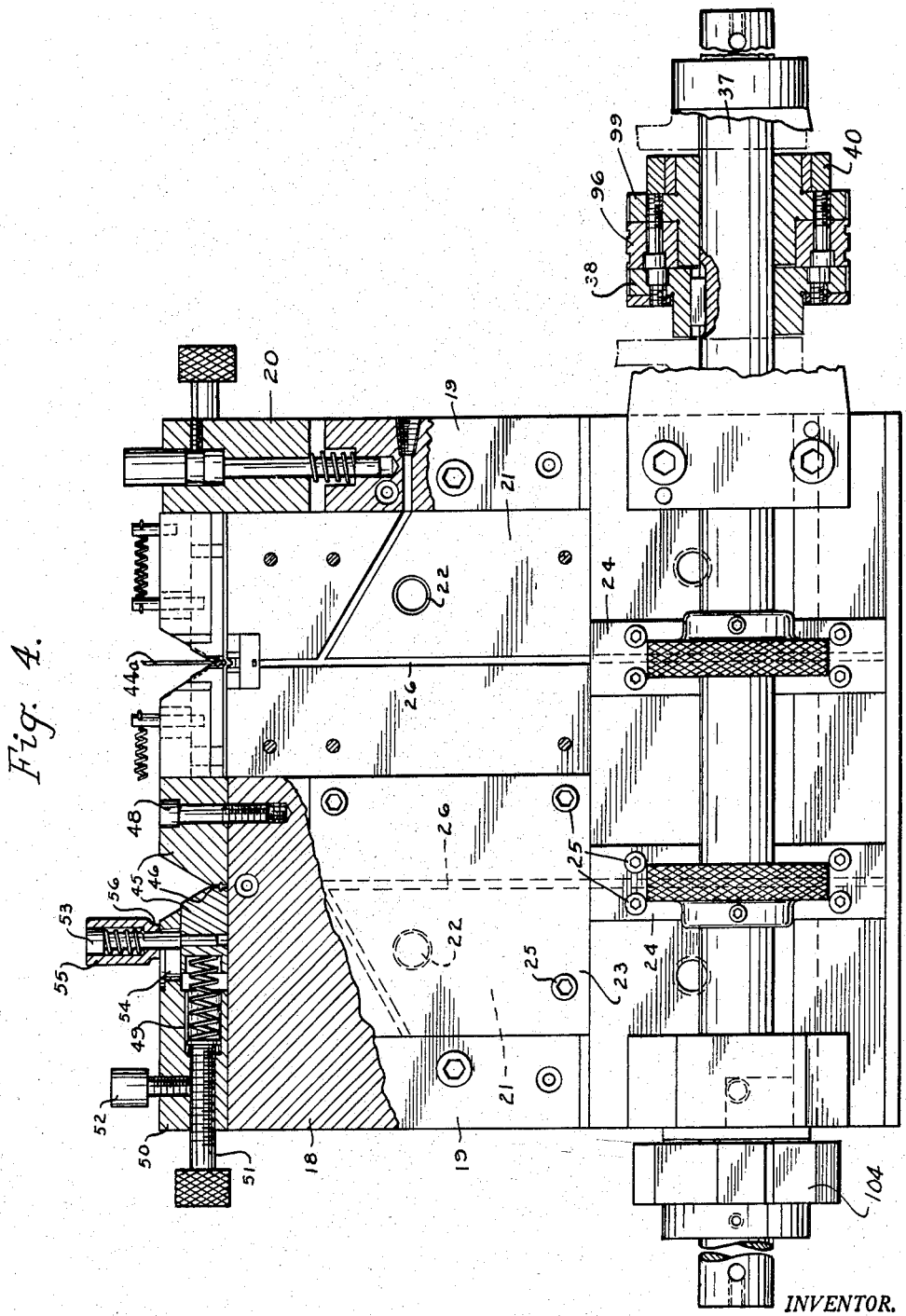
Figure 5:
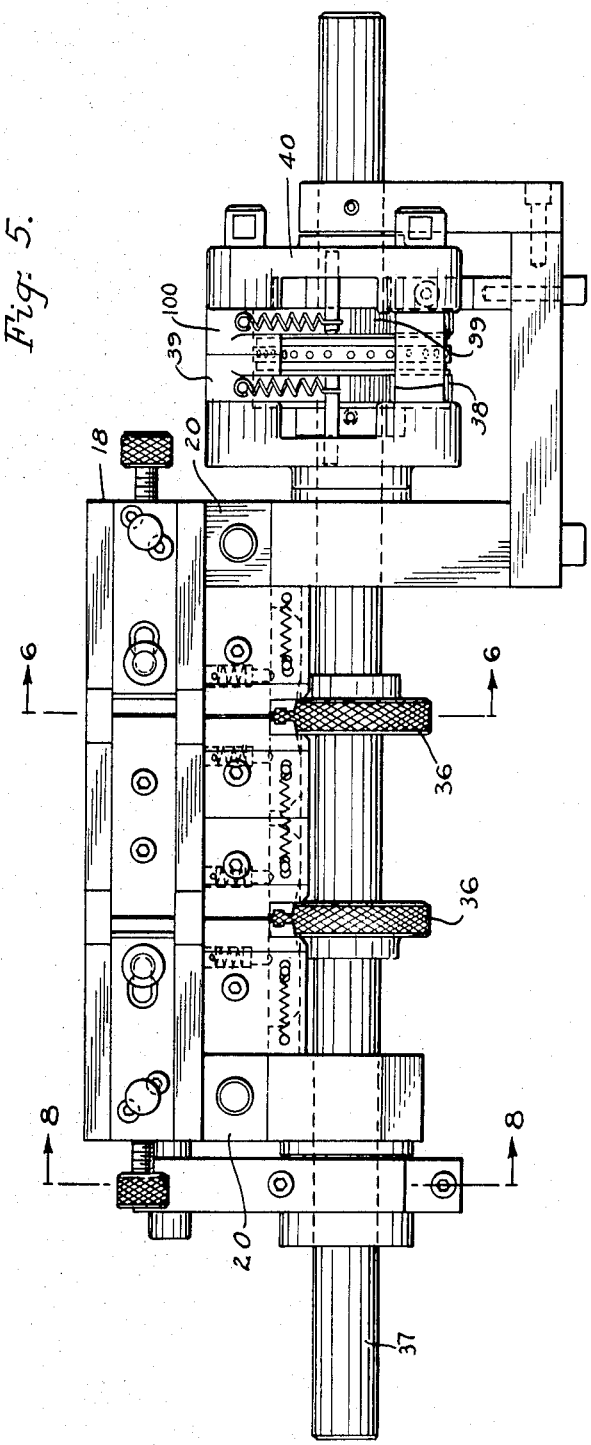
Figure 6:
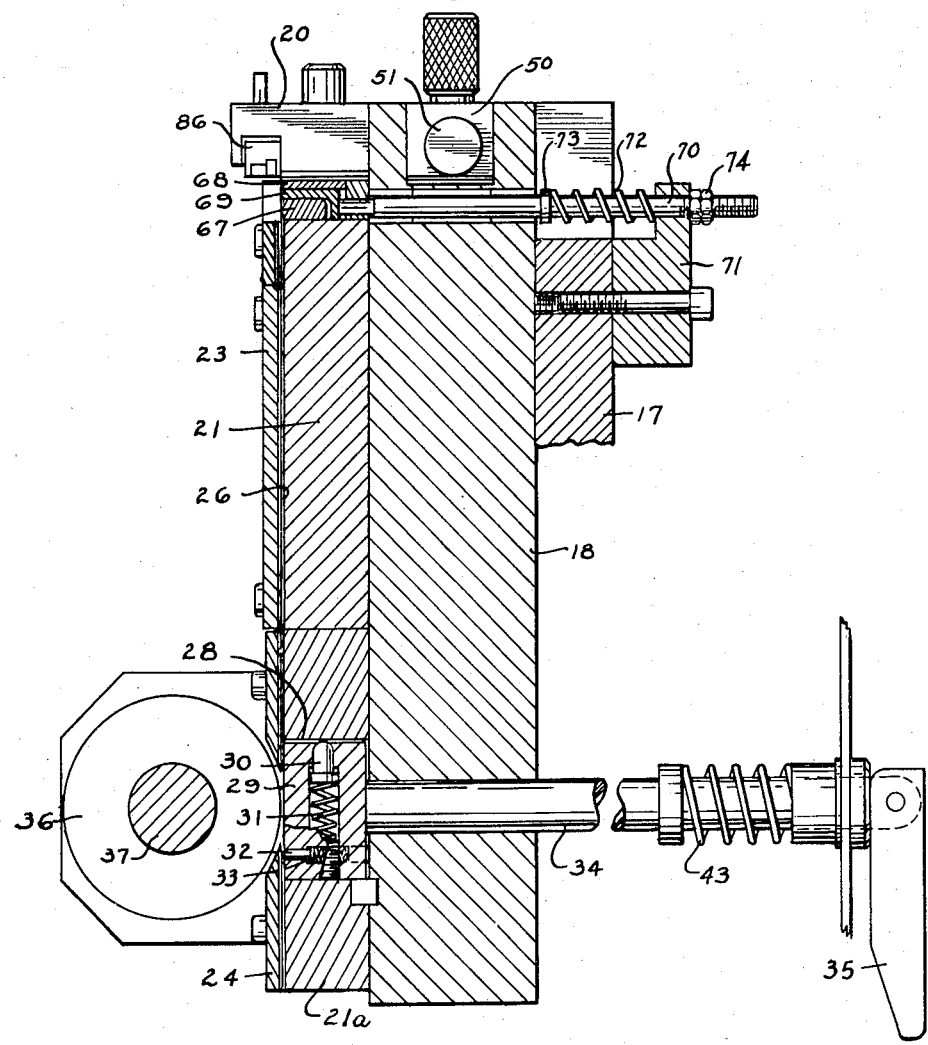
Figure 10:
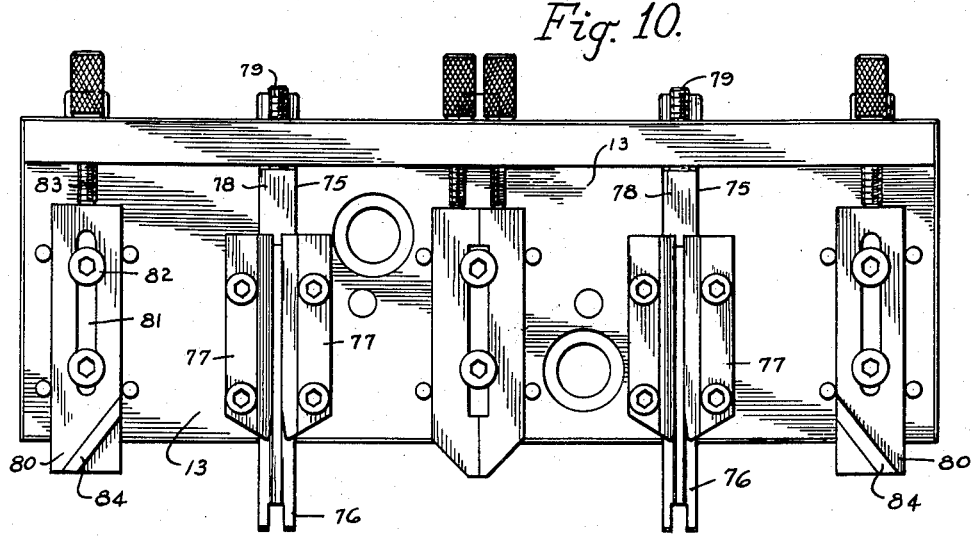
Figure 11:
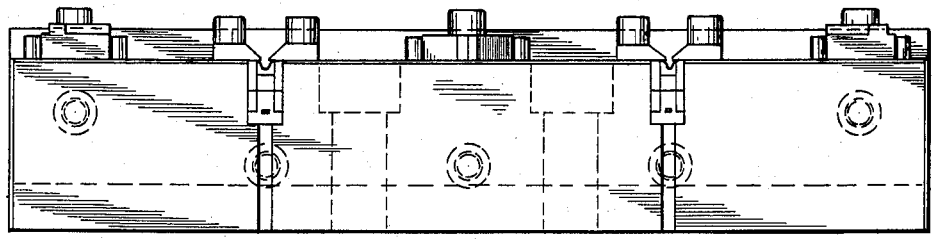
Figure 12:
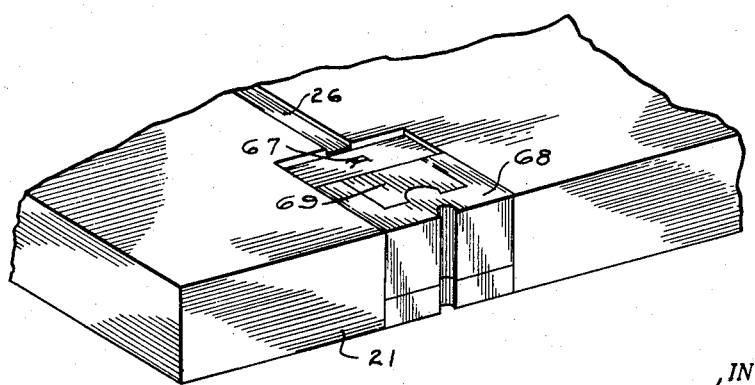
Figure 18:
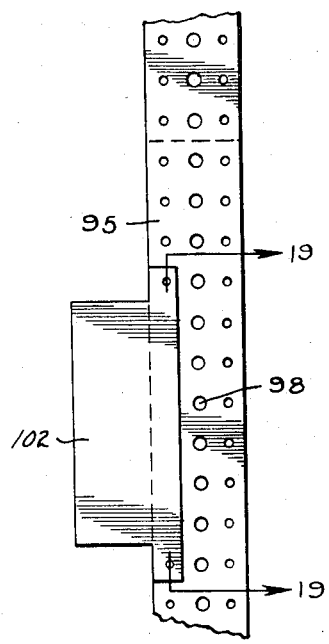
Figure 13:
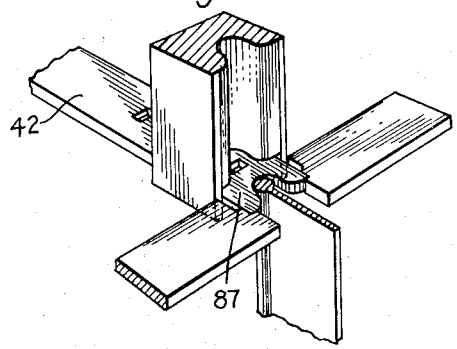
Figure 14:
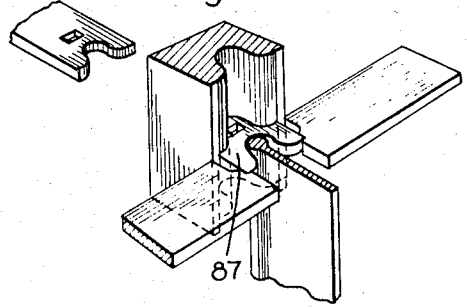
Figure 19:
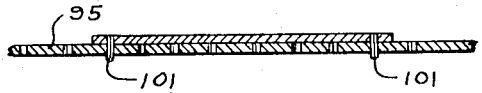
Figure 15:
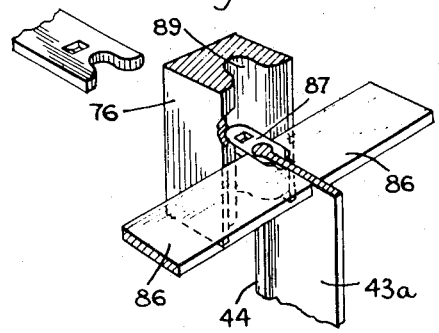
Figure 16:
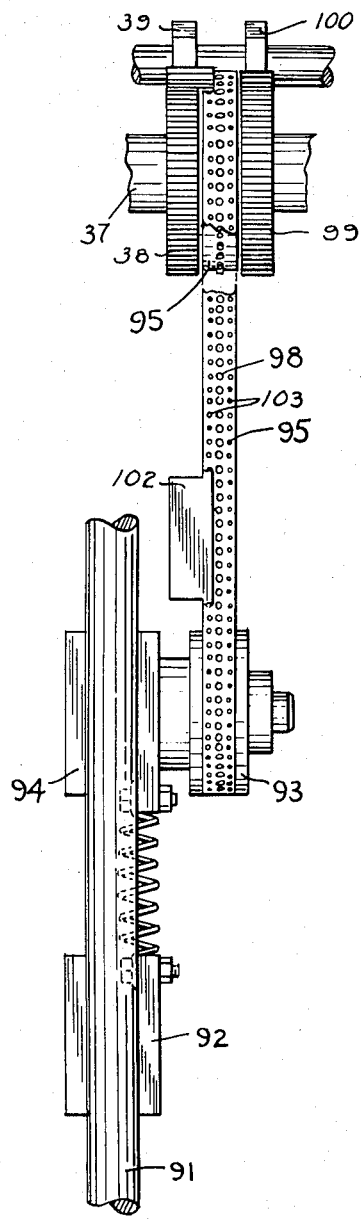
Figure 17:
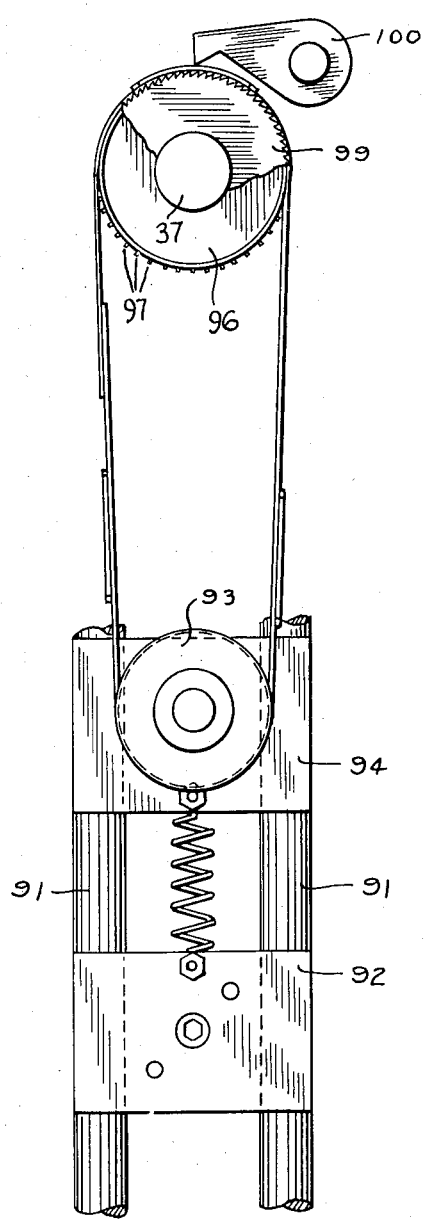

Other objects and advantages will become hereinafter more fully apparent as reference is had to the accompanying drawings wherein my invention is illustrated, by way of example and in which Figure 1 is a side elevation of my improved chain machine, taken from the right side of Figure 2, Figure 2 is a rear elevation of the machine which is the left side of Figure 1, Figure 3 is a top elevation thereof, Figure 4 is a vertical section taken along the line 4—4 of Figure 3, the stripper plate, die plate and a portion of the bolster plate being broken away at the upper left side, a stripper plate being removed from the right side, Figure 5 is an enlarged view of the bolster plate assembly with the metal feeds and control shaft also being shown, Figure 6 is a vertical section taken along the line 6—6 of Figure 5, Figure 7 is a somewhat diagrammatic perspective pictorially illustrating the metal feed, the element forming tools and the attachment of the elements to the tape, Figure 8 is a vertical section through a shaft brake taken along the line 8—8 of Figure 5, Figure 9 is an enlarged perspective view of one closing jaw with its actuating means, Figure 10 is a top elevation of the punch block assembly which includes the closing jaw actuators, Figure 11 is an enlargened front view of the upper portion of the die plate assembly, Figure 12 is a perspective of a fragment of the die plate showing one die block in operating position therein, Figures 13, 14 and 15 are diagrammatic perspectives showing the steps in forming and attaching elements to a tape, Figure 16 is an enlargened front detail view of the gap forming means taken along the line 16—16 of Figure 1, Figure 17 is a side elevation of the gap forming means of Figure 16 which is also an elevation as indicated by the line 17—17 of Figure 2, Figure 18 is an enlarged front elevational detail of the metal tape and trip of the gap forming mean, and Figure 19 is a vertical section taken along the line 19—19 of Figure 18.

More particularly, 1 refers to the base members of the main frame having supporting feet 2 from which legs 3 arise to form a stand for the chain machine. A driving motor 4 is supported in the stand for driving the main cam shaft 5 by means of a belt 6. As best seen in Figures 2 and 3, the cam shaft 5 is supported in bearings within bearing housing 7 and a cam carried by the cam shaft within the housing 8 is pivotally connected by a pin 9 to the ram 10. The ram 10 is supported by and guided by the ram guides 11 for reciprocatory movement toward and away from the cam shaft.

Keyed to the end of the ram at 12 for movement therewith is the punch block 13 as will be hereinafter more fully described.

On top of the base legs 3 are frame members 14 which support upper frame members 15, 16 and 17 as seen in Figure 1 and others as seen in other figures. The frame member 17 supports the bolster plate 18 which in turn carries the die plate guides 19 and the die plate adjusting blocks 20. Die plates 21 (Figures 4 and 6) are positioned between the guides 19 and secured to the bolster plate 18 by the screws 22. Stripper plates 23 and 24 are secured to the die plates 21 by screws 25. In this connection, it will be seen that Figure 4 is a frontal view of the general bolster plate assembly with the left die plate guide, the left stripper plate and the left die plate being broken away to reveal the bolster plate 18, the right stripper plate 23 being removed to reveal the right die plate 21, the right die plate guide 19 also being broken away. It will thus be seen that each die plate has a groove 26. Two spools of metal are carried by a spool support (not shown) and fed through the guideways 27 (Fig. 1) and into the grooves 26. The stripper plates 23 and 24 serve as the covers for the grooves.

Immediately below the die plates 21 is a plate 21a which is covered by the lower stripper plates 24 and which houses the metal retractor means best illustrated in Figures 6 and 7. Each retractor is composed, essentially, of an opening 28 through the plate 21a having a block 29 therein of slightly smaller dimensions, than the opening 28. This block has a plunger 30 urged outwardly through an opening in the top of the block by a spring 31, and a second plunger 32 urged outwardly through an opening in the side of the block by a spring 33. The lower stripper plates 24 retain the block 29 in the plate 27, the left side of the block, as viewed in Figure 6 being approximately in the plane of the bottom of the groove 26 and forming a part of the groove. The plunger 32 acts against one of these stripper plates urging the block 29 out of the plane of the bottom of the groove 26 and against the bolster plate 18, when permitted to do so by a shaft 34 which contacts the block 29 during the operation of the machine maintaining its left face (Fig. 6) in the plane of the bottom of the groove 26 under the influence of a spring 43 but retractible by means of a cam handle 35.

A knurled wheel 36 (Figure 7) carried by a shaft 37 extends through the stripper plates 24 into proximity with each block 29. These wheels are intermittently driven by a ratchet wheel 38, in turn, intermittently driven by a pawl 39 (Figures 1 and 7) pivotally mounted on a bell crank plate 40. This plate 40 is pivotally mounted on the shaft 37 (Figure 7) and pivotally attached to a rocker arm 41 rotatably mounted on a cam 42 on the shaft 5.

The action to this point is as follows: if a strip of metal 42 from which the slide fastener elements are to be formed and sheared is fed by hand into the passageway 27 and into the groove 26 until it passes between the wheel 36 and the block 29 (the handle 35 being in the position illustrated), rotation of the cam shaft 5 causes a reciprocation of the ram 10 and a reciprocation of the rocker arm 41. The bell crank plate 40 is caused to oscillate about the shaft 37 so that the pawl 39 alternately drives the ratchet wheel 38 and the wheel 36 through a portion of a revolution and releases driving contact therewith. By virtue of the pressure of the spring 43 acting through the shaft 34 the metal strip is in pressure contact with the wheel 36 so that with each partial rotation of the wheel 36 the strip 42 is advanced a corresponding amount in the groove 26. If the cam handle 35 is moved to a horizontal position this pressure vanished and the strip 42 ceases to advance in the groove 26 even though the motor 4 continues to drive the cam shaft 5.

As the strip 42 is advanced by a partial driven rotation of the wheel 36 the block 29, because of its frictional contact with the strip 42, is moved against the pressure of the spring 31 against the top of the opening 28. Upon completion of a driven movement of the wheel 36 the pawl 39 releases from engagement with the ratchet wheel 38 whereupon the spring 31 through the plunger 30 forces the block 29 away from the top of the opening 28. The movement of the block causes a corresponding reverse movement or retraction of the strip 42. This movement need be only a slight amount, for instance, .0005 of an inch to prevent the formation of metal chips at the shearing tools, as will be again referred to hereinafter.

As the elements are sheared from the strip 42 they are clamped on a cloth tape 44a which has a bead 44, as is illustrated in Figure 7 and as will be further described. The tape is fed from two spools (not shown) which may be located near the chain machine in front of the handles 35 for unwinding at the approximate level of the top of the bolster plate 18. Incidentally, the right side of the machine, as viewed in Figures 1 and 3, is the front of the machine. This machine is known as a double header machine which means that it has two sets of punches and dies which simultaneously form two elements and attach them separately to two tapes. The two tape spools therefore each supply tape, each tape running substantially parallel to and directly above each rod 34 and between the tapered blocks 45 (Figure 4). Each pair of blocks 45, at their adjacent ends, are inclined for a portion of their height and, in their lower portion, provide a slot 46 to receive the bead 44 of the tape 44a, as best seen in Figure 4. One of these jaws is held firmly on the bolster 18 by a screw 48 while the other jaw is urged toward it by a spring 49 principally housed by the tension slide guides 50. A manually adjustable screw 51 having a set screw 52 adjusts the pressure of the spring 49 on a tension block 45 and, hence, adjusts the pressure exerted against the tape 44a. This pressure may be relieved at the will of the operator by moving the pin 53 to the left (Figure 4). This pin rides in a slot 54 in the guide 50 and, if, when the pin is moved to the left, it is desired that the jaws remain open the spring top 55 may be slid down on the pin 53 thus permitting its lower portion 56 to act as a spacer between the pin and the right wall of the slot 54.

After the tape 44a passes between the tension guides 45 it then passes the punch, die and hobs where the elements are formed and attached thereto as will be hereinafter described, and it then passes between the knurled wheel 57 and the pressure pad 58 as best seen in Figures 1 and 3. This wheel is mounted on a shaft 59 rotatably supported by the brackets 60, the shaft 59 carrying a ratchet wheel 61 for intermittent rotation by a pawl 62 mounted on the plate 62a and driven by the shaft 5 so that movement of this pawl is in exact timing with the movement of the pawl 39.

The pressure pads 58 are each mounted on the end of a rod 63 (Figure 3) which passes through a guide 64 fixedly mounted on the outer end of bracket 60. A spring 65 between the guide 64 and a shoulder on the rod 63 urges the pressure pad into pressure contact with the tape 44a which is between each pad 58 and its knurled wheel 57 so that as the pawl 62 and ratchet 61 drive the knurled wheels 57 the tapes are pulled through the tension guides 45. The rods 63 of the pressure pads project outwardly through their guides 64 and have cam handles 66 on the outer ends thereof. When the free ends of these handles are elevated to horizontal position (Figure 1) the pressure pads are each withdrawn from their wheels 57 so that the tapes will not be pulled through the guides 45 even though the motor 4 continues to rotate.

The tools and the formation of the elements will not be described. As best seen in Figures 6, 11 and 12, the die plate 21 has an opening at the upper end thereof at the top of the metal strip groove 26. A block having a projection 67 serves as a male hob. A shearing die 68 is fixedly secured in the plate 21 and the legs of this die with a wall of the hob 67 houses the knockout 69. A rod 70 passes freely through a frame member 71 and through the bolster 18 where it contacts the bottom of the knockout 69. A compression spring 72 between the frame member 71 and a collar 73 on the rod 70 urges the return of the knockout after each displacement. The rod may be adjusted as to its return position by rotation of the nuts 74 on the outer end thereof.

The punch block 13, as best seen in Figures 3 and 10, is carried by the ram 10. It has two slots 75 to receive the two punches 76 which are each held in place by two retainers 77 and by a top block 78 adjustable by means of a set screw 79. The female hob members are carried by the punch block in rear of the punches 76 for engagement with the hob members 67. Also carried by the punch block are two closing jaw actuators 80. Each actuator has a slot 81 for engagement by the screws 82 for adjustment, and a set screw 83 to assure that the selected adjustment will be maintained during operation. Each actuator has an inclined groove 84 for engagement with a similar slot 85 in each closing jaw 86, as best seen in Figure 9. The closing jaws rest on top of the stripper plates 23 immediately adjacent the die plate 21 as best seen in Figure 6.

The action is as follows: as the metal strip 42 is advanced in the groove 26, as previously described, it first overpasses the hob member 67 where the male and the female hob form a cup when viewed from the bottom of the strip and a projection when viewed from the top thereof. This is the interlocking cup and projection of the fastener element. The strip is then advanced and another cup and projection is formed and as the strip is again advanced it overlies the shearing die 68 in front of a punch 76 and comes to rest against the outer notch 88 in the closing jaws 86. As the punch advances, an element 87 is sheared from the end of the strip 42. As the punch completes its shear the end of the strip 42 is depressed, the knockout 69 travelling inwardly with respect to the die 68. As the punch 76 continues its inward movement, the sheared element rests on the die 68, its rounded head rides upwardly into the groove 89 of the punch and the closing jaws approach each other thus clamping the legs of the element on the bead 44 of the tape 43.

The exact timing of the shearing and closing movement may be altered by shifting the relative positions of the actuators 80 and the punches 76 and by altering the inclination of the cam surfaces 84 and 85. Thus, the setting may be such that the closing of the jaws 86 begins as the shearing begins and is completed when the shearing is completed. Preferably, the closing of the jaws takes place only to a minor extent prior to the shearing of the metal so that the actual gripping of the tape bead 44 by the element does not occur until after the shearing of the element is completed, as is illustrated in the three steps shown in Figures 13, 14 and 15. As soon as the shearing of an element occurs the strip 42 is slightly retracted, as previously described, so that upon withdrawal of the punch the edge of the strip will have clearance.

While it is the customary practice in many plants to mount elements uninterruptedly on the tape this machine will interrupt the mounting of elements of any preselected interval thus forming gaps along the tape. The gap forming device will now be described.

Arising from a lower frame member 1 and secured to an upper frame member 16 are two parallel rods 91 which act as a guide for a weight 92, springingly supported from a second guided weight 94. A shaft projects from said second weight and rotatably supports a pulley 93. A metal band 95 loops this pulley 93 and overlies a second pulley 96 mounted for rotation with a second ratchet wheel 99. The pulley 96 has a series of small projections 97 on the surface thereof for engagement with holes 98 in the band 95 so that the band must rotate as the ratchet wheel 99 rotates. The ratchet wheel 99 and pulley 96 are freely rotatable on the shaft 37 and hence rotate in response to the movements of a pawl 100 mounted upon the plate 40 for movement with the pawl 39.

Attached to the band 95 by small projections 101 (Figure 19) is one or more trips 102. Each trip rides up under the pawl 39 elevating it from driving connection with the ratched wheel 38 thus interrupting the rotation of the shaft 37. The feeding of the metal strip 42 is thus interrupted until the trip 102 rides past the pawl 39 thus allowing it to engage the ratchet wheel 38 again and thus resume driving movements of the shaft 37. The band 95 continues to be driven at all times by the ratchet wheel 99 and pawl 100 since the trip 102 does not affect them. Also the feeding of the cloth tape 43 continues so that when the pawl 39 is in elevated position the tape will pass between the punch 76 and die 68 without having elements 87 attached thereto as none will be formed. The usual gap space is towo inches but may be shorter or longer, as desired. The number of trips 102 which may be used will vary, depending upon the length of finished slide fastener desired. If very short fasteners are desired then a relatively long band 95 will be employed with trips attached at intervals equal to the desired fastener length. For longer lengths I may provide different length bands each having only a single stop. The band may be made adjustable in length by providing one end with projections 101 which engage holes 103 at any desired place to form an endless band of desired length with, possibly, only one trip 102.

In order to prevent coasting of the shaft 37 I provide a brake 104, suitably placed at the opposite end of the shaft from the pulley 96. The brake is composed of a main member 105 pivotally mounted on a pin 106 projecting outwardly from the main frame. This member has an arcuate bearing portion 107 provided with a cylindrical liner 108 and a friction liner 109 therein which encircle the shaft 37. A cap 110 completes the circumferential envelopment of the linings. A screw 111 passes freely through a hole in the cap 110 and is threaded into the member 5. A spring 112 urges the cap in pressure contact with the liners.

Various changes may be made without departing from the spirit of my invention and I therefore desire to be extended protection as defined by the appended claims.

What I claim is:

1. In the method of making slide fastener chain, the steps of progressively shearing elements from the end of a strip of metal, holding each sheared element by a three point support after the shearing and without removing the element from the tools which sheared it and thereafter clamping it securely to a tape.

2. In the method of making slide fastener chain, the steps of progressively shearing elements from the end of a strip of metal, holding each sheared element by the tools which sheared it and by clamping jaws and thereafter clamping the element on a tape by actuating said jaws toward each other.

3. In the method of making slide fastener chain the steps of progressively shearing elements from the end of a strip of metal, holding each element after it is sheared by means of the tools which sheared it and by means of clamping jaws against the legs thereof, clamping each element on a tape by actuation of said jaws toward each other, and retracting said strip of metal away from said tools during the clamping movement of said jaws.

4. In the method of making slide fastener chain, the steps of advancing a strip of metal between a punch and a die and against clamping jaws, advancing said punch past said die thereby shearing an element from the end of said strip, continuing the movement of said punch thereby causing the sheared element to ride upwardly in the shank of said punch, clamping said element on a tape while holding it in position by the contact with said shank, by contact with said die and by continued contact with said clamping jaws, and withdrawing said strip from said punch while clamping said element on said tape.

References Cited in the file of this patent

UNITED STATES PATENTS

| | | |
|---|---|---|
| 2,302,075 | Ulrich | Nov. 17, 1942 |
| 2,370,380 | Ulrich | Feb. 27, 1945 |
| 2,396,933 | Voity | Mar. 19, 1946 |